United States Patent
Depew et al.

(10) Patent No.: US 10,740,270 B2
(45) Date of Patent: Aug. 11, 2020

(54) SELF-TUNE CONTROLLER

(71) Applicant: HEWLETT PACKARD ENTERPRISE DEVELOPMENT LP, Houston, TX (US)

(72) Inventors: Kevin G. Depew, Houston, TX (US); Vincent Nguyen, Houston, TX (US); Scott P. Faasse, Houston, TX (US); Robert E. Van Cleve, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/578,521

(22) PCT Filed: Jun. 26, 2015

(86) PCT No.: PCT/US2015/038015
§ 371 (c)(1),
(2) Date: Nov. 30, 2017

(87) PCT Pub. No.: WO2016/209268
PCT Pub. Date: Dec. 29, 2016

(65) Prior Publication Data
US 2018/0165238 A1    Jun. 14, 2018

(51) Int. Cl.
*G06F 13/40*    (2006.01)
*G06F 13/12*    (2006.01)
(Continued)

(52) U.S. Cl.
CPC ...... *G06F 13/4009* (2013.01); *G06F 11/3027* (2013.01); *G06F 11/349* (2013.01);
(Continued)

(58) Field of Classification Search
None
See application file for complete search history.

(56) References Cited

U.S. PATENT DOCUMENTS

| 5,485,586 A | 1/1996 | Brash et al. |
| 6,018,803 A * | 1/2000 | Kardach ............... G06F 1/3215 713/323 |

(Continued)

FOREIGN PATENT DOCUMENTS

EP    2626790 A1    8/2013

OTHER PUBLICATIONS

Jann. J. et al, "Dynamic Reconfiguration: Basic Building Blocks for Autonomic Computing on IBM Pseries Servers," 2003, pp. 29-37.
(Continued)

*Primary Examiner* — Henry Tsai
*Assistant Examiner* — Christopher A Bartels
(74) *Attorney, Agent, or Firm* — Hewlett Packard Enterprise Patent Department

(57) ABSTRACT

Example implementations relate to a self-tune controller. For example, the self-tune controller may poll, via an out-of-band data stream, low-level operation information about a processor or a bus of a computing system under a present workload. At least some of the low-level operation information may be descriptive of a nature of traffic on the bus. The self-tune controller may program, via an out-of-band control signal, a setting of the computing system for the present workload based on the low-level operation information.

19 Claims, 5 Drawing Sheets

(51) Int. Cl.
  *G06F 11/30* (2006.01)
  *G06F 11/34* (2006.01)
(52) U.S. Cl.
  CPC ............ *G06F 13/122* (2013.01); *Y02D 10/14* (2018.01); *Y02D 10/151* (2018.01)

(56) References Cited

U.S. PATENT DOCUMENTS

| | | | |
|---|---|---|---|
| 6,059,842 A | 5/2000 | Dumarot et al. | |
| 6,671,802 B1 | 12/2003 | Ott | |
| 8,356,143 B1* | 1/2013 | Bulusu | G06F 13/1673 |
| | | | 711/108 |
| 8,849,891 B1 | 9/2014 | Suchter et al. | |
| 9,432,298 B1* | 8/2016 | Smith | H04L 49/9057 |
| 2004/0210782 A1* | 10/2004 | Hsu | G06F 11/348 |
| | | | 713/300 |
| 2007/0186051 A1 | 8/2007 | Harada | |
| 2008/0126750 A1* | 5/2008 | Sistla | G06F 12/0831 |
| | | | 712/30 |
| 2008/0313312 A1* | 12/2008 | Flynn | G06F 3/065 |
| | | | 709/221 |
| 2009/0037658 A1* | 2/2009 | Sistla | G06F 12/0831 |
| | | | 711/119 |
| 2009/0089554 A1 | 4/2009 | Blackmon et al. | |
| 2011/0225274 A1* | 9/2011 | Dvorkin | G06F 9/44505 |
| | | | 709/222 |
| 2013/0047039 A1 | 2/2013 | Manes et al. | |
| 2013/0080760 A1 | 3/2013 | Li et al. | |
| 2013/0080761 A1* | 3/2013 | Garrett | G06F 11/3414 |
| | | | 713/100 |
| 2013/0339544 A1* | 12/2013 | Mithyantha | H04L 45/02 |
| | | | 709/238 |
| 2014/0108778 A1* | 4/2014 | Molloy | G06F 9/223 |
| | | | 713/100 |
| 2014/0344595 A1* | 11/2014 | Jenne | G06F 1/32 |
| | | | 713/320 |
| 2015/0120977 A1* | 4/2015 | Hunsaker | G06F 13/364 |
| | | | 710/110 |
| 2016/0140039 A1* | 5/2016 | Sodani | G06F 12/0646 |
| | | | 711/119 |
| 2016/0142427 A1* | 5/2016 | de los Reyes | H04L 63/20 |
| | | | 726/23 |
| 2017/0116103 A1* | 4/2017 | Cencini | G06F 11/3055 |

OTHER PUBLICATIONS

International Search Report & Written Opinion received in PCT Application No. PCT/US2015/038015, dated Mar. 22, 2016, 16 pages.

* cited by examiner

SELF-TUNE CONTROLLER

BACKGROUND

A computing system may include at least one processor, memory, and input/output (I/O) devices. I/O devices may include storage, a network interface card, peripherals, or the like. A processor may be connected to other processors, memory, and I/O devices by way of busses. A computing system may perform different workloads, and different workloads may utilize the processor and bus resources of a computing system in different ways and to different extents.

BRIEF DESCRIPTION OF THE DRAWINGS

Various examples will be described below with reference to the following figures.

DETAILED DESCRIPTION

A computing system may include components such as at least one processor, memory, and input/output (I/O) devices. I/O devices may include storage, a network adapter, peripherals, or the like. The computing system may utilize interconnects, also referred to as busses, to route data traffic (e.g., requests and responses) between the components. A component communicating over a bus may be deemed a requestor and may be identified by a requestor ID on the bus. Traffic on a bus may be controlled by a bus controller, and some bus controllers may keep track of a finite number of requests at a time. Additionally, traffic may travel (or be routed) across multiple busses to reach its destination. In some instances, performance-related bus characteristics or settings may include a maximum bandwidth (also referred to as throughput), a minimum response latency, a maximum number of outstanding transactions (also referred to as queue depth), a maximum and a minimum data transfer size, and a bus management overhead (e.g., as a percentage of maximum bandwidth).

The processor(s) of the computing system may execute instructions and process data that reside in the memory or I/O devices. Such instructions may originate from a workload, which may be initiated on the computing system by an application, an operating system, or the like. Execution of such instructions may impact traffic on the various busses of the computing system. Some I/O devices (e.g., network adapters or graphics processing units) may also generate traffic on the various busses.

For a particular workload conducted on a computing system, there may be at least one configuration of bus or processor settings that yields optimal or near-optimal computing system performance. However, in some instances, bus and processor settings may be tuned based on a benchmark test of the computing system and may be static. Such static bus and processor settings may not be well-suited for actual workloads that may vary over time. Computing systems that do allow changes to bus or processor settings generally may involve rebooting to effectuate changed settings. Additionally, bus characteristics may be interrelated and changing one can impact another. Accordingly, it may be useful for a computing system to include a self-tune controller to monitor low-level operation information of the computing system (such as the nature of traffic on a bus) and to dynamically adjust settings of the computing system (such as bus settings) for a present workload based on the monitored information.

Figure 1:
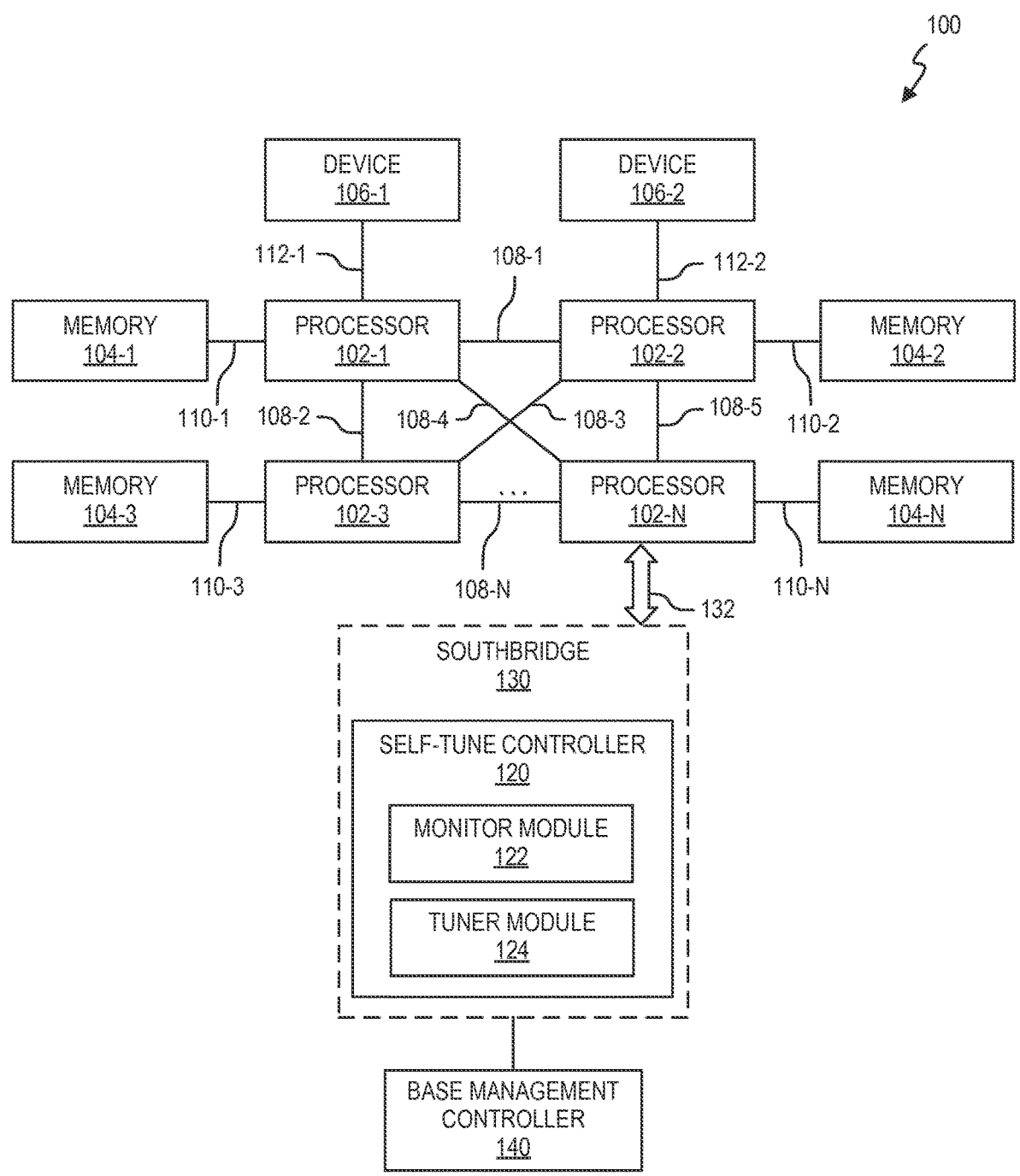
FIG. 1 is a block diagram of an example computing system that may include a self-tune controller according to an implementation.

Referring now to the figures, FIG. 1 is a block diagram of an example computing system 100, the settings of which may be adjusted for a present workload. In some example implementations, the computing system 100 may be a server, a desktop computer, a desktop computer, a workstation, a laptop computer, or the like. The computing system 100 may include at least one processor (e.g., 102-1, 102-2, 102-3, through 102-N), memory (e.g., 104-1, 104-2, 104-3, through 104-N), and devices (e.g., 106-1, 106-2). Although multiple processors are illustrated in FIG. 1, it should be understood that the techniques described herein may be applied to a computing system having less processors (e.g., a single processor computing system). The devices 106-1, 106-2 may be I/O devices, such as storage, a network adapter, peripherals, or the like.

The computing system 100 may include busses to connect various components. In other words, data traffic may be communicated between various components by way of busses. Processor interconnect busses (e.g., 108-1, 108-2, 108-3, 108-4, 108-5, through 108-N) may connect the processors (e.g., 102-1 through 102-N) to each other. For example, as illustrated in FIG. 1, the processor 102-1 may be connected to the processor 102-2 by way of the processor interconnect bus 108-1 and may be connected to the processor 102-3 by way of the processor interconnect bus 108-2. In some implementations, the processor interconnect busses 108-1 through 108-N may be an Intel® QuickPath Interconnect, a HyperTransport™ interconnect, or the like, for example.

Memory busses (e.g., 110-1, 110-2, 110-3, through 110-N) may connect the processors (e.g., 102-1 through 102-N) to memory (e.g., 104-1 through 104-N). In some implementations, the memory busses 110-1 through 110-N may be implemented according to a specification, such as DDR3, DDR4, or the like. In some configurations, each processor may be connected to a respective local memory, and all other memory (e.g., shared memory or memory that is local to different processors) may be deemed non-local or distant memory. For example, the processor 102-1 may be directly connected to its local memory 104-1 by way of the memory bus 110-1, but memory 104-1 may be deemed non-local to the processor 102-2, at least in part because the processor 102-2 communicates with memory 104-1 indirectly over two busses: the processor interconnect bus 108-1 and the memory bus 110-1. In some implementations, a processor may access its own local memory faster than non-local memory.

I/O busses (e.g., 112-1, 112-2) may connect processors (e.g., 102-1, 102-2) to devices (e.g., 106-1, 106-2), respectively. For example, I/O busses may be Peripheral Component Interconnect Express busses (also referred to as PCI Express or PCIe) or the like. In some implementations, the processors 102-3 through 102-N may each be connected to devices through respective busses (not shown) that are similar to the I/O busses 112-1, 112-2.

In some implementations, each processor 102-1 through 102-N may include at least one controller or microprocessor for managing traffic on the busses connected to that processor (e.g., the processor interconnect busses 108-1 through 108-N, the memory busses 110-1 through 110-N, or the I/O busses 112-1, 112-2). Such a controller may be included on a processor's die but may be separate from the processor's core (a core being responsible for reading and executing instructions and performing computations). As such, a traffic-managing controller may be deemed part of an uncore of a processor. FIG. 1, as described above, illustrates but one example implementation of a computing system 100, and it should be understood that the techniques described herein may be useful for and applicable to various other computing system architectures.

The computing system 100 also includes a self-tune controller 120. The self-tune controller 120 may include a monitor module 122 and a tuner module 124. A module, as defined herein, may include a series of instructions encoded on a machine-readable storage medium and executable by a processor. For example, the processor may be a microprocessor, an application-specific integrated circuit, a field programmable gate array, and/or other hardware device suitable for retrieval and/or execution of instructions. Additionally or alternatively, each module may include one or more hardware devices including electronic circuitry for implementing functionality described herein.

The self-tune controller 120 (and thereby the monitor module 122 and the tuner module 124) may be implemented independent of (separately from) the processors 102-1 through 102-N. In particular, in some implementations, tasks performed by the self-tune controller 120 do not take away execution cycles of the processors 102-1 through 102-N. In some implementations, the self-tune controller 120 may be implemented, at least in part, on a southbridge 130 of the computing system 100 (as indicated in dashed lines on FIG. 1). The southbridge 130 may be a chipset that manages data traffic between the processors 102-1 through 102-N and other components, such as, for example, storage controllers (e.g., SATA, PATA, etc.), System Management Bus (SM-Bus), Universal Serial Bus (USB), and basic input/output system (BIOS) memory, among others. The southbridge 130 may be connected with the processors 102-1 through 102-N by a bus 132. For example, the bus 132 may be an Intel® Direct Media Interface, a PCIe connection, or the like.

In some implementations, the monitor module 122 or the tuner module 124 may be implemented on a processor of the self-tune controller 120 or the southbridge 130. In some implementations, the monitor module 122 may be implemented as part of the southbridge 130 while the tuner module 124 may be implemented as a separate controller, or vice versa.

The self-tune controller 120 (and thereby the monitor module 122 and the tuner module 124) also may be implemented independent of (separately from) an operating system the computing system 100. In other words, tasks performed by the self-tune controller 120 do not rely on information collected or analyzed by the operating system.

The monitor module 122 may collect (or poll or monitor) low-level operation information about a processor (e.g., one or more of the processors 102-1 through 102-N) and a bus (e.g., one or more of the busses 108-1 through 108-N, 110-1 through 110-N, 112-1, 112-2, or 132) of the computing system 100 under a present workload. In some implementations, low-level operation information may relate to operation or performance of a bus or a processor at a hardware or firmware abstraction layer. At least some of the low-level operation information may be descriptive of a nature of traffic on a bus, that is, the information may describe the type of traffic on the bus (e.g., whether traffic relates to a particular component), a direction of traffic on the bus (e.g., whether traffic is flowing to or from a component), or a quantification of traffic on the bus (e.g., a payload size, bus utilization, transaction counts on a bus, or the like). The collected low-level operation information may relate to a present workload. That is, instructions currently executed by the computing system 100 may affect utilization of the processors or busses of the computing system 100, and such affected utilization may in turn be reflected in the collected low-level operation information.

In some implementations, the monitor module 122 may collect at least some of the low-level operation information via an out-of-band data stream, that is, without utilizing execution cycles of the processors 102-1 through 102-N or without involvement from an application, an operating system, BIOS, or the like, of the computing system 100. For example, the monitor module 122 may directly poll chipset registers of the processors 102-1 through 102-N, and more particularly, of traffic-managing controllers of the uncore portion of the processors 102-1 through 102-N to collect the low-level operation information.

The tuner module 124 may dynamically adjust a setting of the computing system 100 for the present workload and based on collected low-level operation information. For example, the tuner module 124 may analyze low-level operation information collected by the monitor module 122 to determine a new tuning of a setting of the computing system 100 for the present workload. Analysis of the low-level operation information may include generating or computing inferences about the workload currently performed by the computing system 100. In some implementations, the tuner module 124 may adjust the setting with reduced or minimized downtime or unavailability of the computing system 100, or without rebooting the computing system 100 in at least some instances. In some implementations, the tuner module 124 may adjust the setting via an out-of-band control signal, that is, without utilizing execution cycles of the processors 102-1 through 102-N or without involvement from an application, an operating system, BIOS, or the like, of the computing system 100. In some implementations, settings of the computing system 100 may be firmware adjustments that affect the operation of hardware of the computing system 100, and more particularly, the settings also may not be accessible at an operating system or application layer of the computing system 100. In some implementations, the new tuning of the setting may optimize or improve at least one performance aspect of the computing system. By virtue of the collected low-level operation information reflecting the present workload of the computing system 100 as described above, setting adjustments made by the tuning module 124 may, in some instances, optimize the computing system 100 in a dynamic manner and effectively in real-time (i.e., real-time with allowance for processing or computational delay, etc.).

In some implementations, the monitor module 122 may store collected low-level operation information in memory or storage of the computing system 100. The collected low-level operation information may be stored in a database, for example. In some implementations, the self-tune controller 120 (i.e., the monitor module 122 and/or the tuner module 124) may construct a workload profile based on the stored low-level operation information. In one example, the profile may be developed into a hysteresis. In some implementations, the self-tune controller 120 may pre-process the stored low-level operation information to minimize noise. In another example, the self-tune controller 120 may perform pattern analysis on the stored low-level operation information. In yet another example, the self-tune controller 120 may perform a multivariate analysis, principal component analysis, or other analyses, on the stored low-level operation information to model the effect of adjusting any combination of settings of the computing system 100 on performance characteristics of the computing system 100. In operation, the tuner module 124 may utilize the results of such analyses to predict future changes in workload (e.g., based on time-based patterns in low-level operation information) or to predict computing system 100 performance when dynamically adjusting settings based on low-level operation information.

As but one illustration, the monitor module 122 may monitor utilization of the busses of the computing system 100. As referred to herein, utilization of a bus may be defined in some instances as a percentage of the maximum bandwidth or throughput of that bus. The tuner module 124 may analyze the utilization information collected by the monitor module 122 to determine if a memory bus or an I/O bus has greater utilization, thus indicating that a workload is either more memory intensive or I/O intensive. In response to such a determination, the tuner module 124 may dynamically adjust settings of the computing system 100, such as maximum memory or I/O bus bandwidth (depending on which type of workload was determined to be more intensive), in an effort to optimize or improve speed, efficiency, power consumption, or other performance metrics for the present workload. Additional examples of low-level operation information that may be collected by the monitor module 122 and corresponding settings that may be adjusted by the tuner module 124 will now be described.

In one example, the self-tune controller 120 may adjust requester queue depth allotments of busses in the following manner. In some implementations, a bus may utilize buffers to track outstanding requests, which may be useful when the bus carries traffic from multiple components of the computing system 100. The destination or requestor associated with outstanding requests may be identified by a destination or requestor ID. In some implementations, buffers for tracking outstanding requests may be divided into groups based on the destination or requestor, and at least some buffers may have a requestor queue depth allotment (per requestor). The requestor queue depth allotment may control how many outstanding requests may be tracked for each requestor ID. In some implementations, the self-tune controller 120 may dynamically adjust the requestor queue depth allotment of a bus on a per requestor basis to be commensurate to the workload (e.g., in a feedback control loop). In operation, the monitor module 122 may collect or poll low-level operation information relating directly or inferentially to a bus transaction rate, per requestor, on the bus. For example, direct information about a bus transaction rate may include a count of transactions (e.g., requests and/or corresponding responses) for each requestor or destination over a period of time for the bus. Inferential information about a bus transaction rate on the bus may include, for example, utilization on a secondary (or subsequent) bus that is a destination of traffic on the bus. For example, device 106-1 may communicate with memory 112-1 by sending requests over I/O bus 112-1 and then, secondarily, over memory bus 110-1, in which case, requests on I/O bus 112-1 may be inferentially determined by observing utilization of the (secondary) memory bus 110-1. In some implementations, the setting adjusted by the tuner module 124 may include a requestor queue depth allotment per requestor. The tuner module 124 may determine a requestor queue depth allotment, per requestor, relative to (appropriate for) the bus transaction rate monitored or collected by the monitor module 122. For example, the tuner module 124 may increase the requestor queue depth allotment for a requestor, if the bus transaction rate of the bus for that requestor is higher than a predetermined threshold or is higher than bus transaction rates of other requestors. Moreover, the tuner module 124 may decrease the requestor queue depth allotment for a requestor, if the bus transaction rate of the bus for that requestor is lower than a predetermined threshold or is lower than bus transaction rates of other requesters. Additionally, where the bus transaction rate is inferential, if the utilization of a secondary bus is saturated (or above a predetermined threshold or higher than other busses of the computing system 100), the requestor queue depth allotment of the bus may be maintained, and more particularly, need not be increased. By virtue of adjusting the requestor queue depth allotment in the foregoing manner, bus buffers may be optimized for a present workload, and more particularly, unused queue depth may be minimized and/or sufficient queue depth for tracking outstanding requests may be provided.

In another example, the self-tune controller 120 may adjust thermal management aspects of the computing system 100 in the following manner. An electronic component of the computing system 100, such as a processor, memory, or an I/O device, may consume power (i.e., draw electrical current) commensurate with an amount of its resources allocated to or utilized by a workload, and an increase in workload may lead to an increase in power consumption, which in turn may increase heat generation and operating temperature of the component. Increased heat and operating temperature may be detrimental to the component's efficiency and/or durability, and accordingly, in some instances, the component may temporarily self-limit its performance to reduce heat generation (e.g., a process referred to as throttling). In some implementations, the monitor module 122 may collect or poll, as low-level operation information, a processor utilization, a bus utilization, a processor limiting event, or a bus limiting event, where such limiting events may correspond with self-limiting of a component. The tuner module 124 may analyze the collected information to detect a reduction in performance of the computing system 100 related to self-limiting of the component. For example, such performance reductions may be detected when decreases in processor or bus utilization, a presence of or increases in processor or bus limiting events, or a combination thereof, are observed. In response, the tuner module 124 may adjust computing system settings including an aggressiveness of a thermal management profile of the computing system 100 to reduce the temperature in the computing system 100 (or more particularly, the temperature of the self-limiting electronic component), which may reduce or minimize self-limiting of the electronic component, and thereby reduce or minimize the negative impact on computing system performance. In some implementations, the aggressiveness of the thermal management profile relates to an adjustable level, intensity, or configuration of cooling or heat dissipation features of the computing system 100, such as fans, liquid coolant circulation, adjustable air flow diverters, or the like. For example, the tuner module 124 may adjust (or increase) the aggressiveness of the thermal management profile to reduce self-limiting of the electronic component by intensifying such cooling and heat dissipation features, and more particularly, by increasing fan speed, increasing liquid coolant circulation (flow rate), configuring adjustable diverters or baffles to direct air flow to the electronic component, or the like. By virtue of adjusting the computing system's thermal management profile based on low-level operation information, an impact on computing system performance due to self-limiting of components may be reduced in a timely manner.

In another example, the self-tune controller 120 may adjust a computing system setting that includes a snoop mode, in the following manner. The computing system 100 may include a snooping mechanism for maintaining cache coherency between the processors (e.g., 102-1 through 102-N), and, in some instances, different snoop modes may be more efficient or preferable (e.g., owing to lower latency) for particular workloads. In some implementations, the monitor module 122 may collect or poll, as low-level operation information, a bus utilization between a processor (to illustrate, e.g., 102-1) and non-local memory (to illustrate, e.g., 104-2, 104-3, 104-N) and a bus utilization between the processor (to illustrate, e.g., 102-1) and local memory (to illustrate, e.g., 104-1). The tuner module 124 may select a first snoop mode when the bus utilization between the processor and non-local memory is greater than the bus utilization between the processor and local memory. For example, the tuner module 124 may deem such relatively greater non-local memory bus utilization to indicate that the present workload is memory latency-sensitive or is a non-uniform memory access (NUMA) workload that prefers maximum local and remote bandwidth, and accordingly, the tuner module 124 may select as the aforementioned first snoop mode an Early Snoop mode (suitable for memory latency-sensitive workloads) or a Home Snoop mode (suitable for NUMA workloads that prefer maximum local and remote bandwidth. The tuner module 124 may select a second snoop mode when the bus utilization between the processor and local memory is greater than the bus utilization between the processor and non-local memory. For example, the tuner module 124 may deem such relatively greater local memory bus utilization to indicate that the present workload is highly NUMA-optimized, and accordingly, the tuner module 124 may select as the aforementioned second snoop mode a Cluster on Die mode suitable for highly NUMA-optimized workloads.

In another example, the self-tune controller 120 may adjust a memory patrol scrubbing function of the computing system 100 in the following manner. In some implementations, the computing system 100 may include a memory patrol scrubbing function that corrects transient errors in memory. The monitor module 122 may collect or poll, as low-level operation information, memory bus utilization. The tuner module 124 may analyze the collected memory bus utilization and adjust a parameter of the memory patrol scrubbing, such as an enable/disable state, a rate, or a duration, to minimize impact on computing system power consumption or computing system performance under the present workload. For example, when the memory bus utilization is high (e.g., above a predetermined upper threshold), the tuner module 124 may disable patrol scrubbing or lower the scrubbing rate, so as to not detract from computing system performance that can be allocated for the present workload. Additionally, patrol scrubbing also may be disabled (or alternatively, performed in fast spurts in brief durations) to reduce computing system power consumption when the memory bus utilization is low (e.g., below a predetermined lower threshold), which may indicate that the memory or memory controller is idle. In some implementations, the tuner module 124 may enable memory patrol scrubbing when the memory bus utilization is moderate (e.g., between the aforementioned predetermined lower threshold and predetermined upper threshold).

Another example of the self-tune controller 120 may relate to a maximum payload size of a bus. In some instances, the maximum payload size may impact a quantity of transactions that can be queued for a particular bus. For example, conservatively setting a maximum payload size to a large size may reduce the number of transactions that may be queued and thereby decrease performance of the computing system 100 for workloads having data traffic smaller (on average) than the maximum payload size. Accordingly, it may be useful for the self-tune controller 120 to adjust the maximum payload size for a bus of the computing system 100 in the following manner. The monitor module 122 may collect or poll, as low-level operation information, bus utilization and a bus transaction rate for a particular bus (e.g., one of 108-1 through 108-N, 110-1 through 110-N, 112-1, or 112-2). The tuner module 124 may analyze the bus utilization and bus transaction rate to determine an average payload size for the particular bus and may adjust the maximum payload size for the particular bus and the present workload, based on the determined average payload size. For example, in some implementations, the tuner module 124 may select a maximum payload size that is larger than the average payload size by a predetermined margin, a payload size variance determined from the bus utilization and bus transaction rate, or other suitable margins.

In another example, the self-tune controller 120 may adjust a dynamic overclocking function of a processor, to reduce an amount of frequency jitter for a present workload. In some implementations, the monitor module 122 may gather or poll, from a processor (to illustrate, e.g., 102-N), an indication of the type of instructions that the processor (e.g., 102-N) is currently executing and infer from those instructions whether the present workload is jitter-sensitive. The monitor module 122 also may collect or poll, as low-level operation information, a processor frequency transition event counter that indicates how many frequency changes the processor (e.g., 102-N) has undergone in a period of time due to its dynamic overclocking function. The tuner module 124 may adjust a processor frequency dynamic range to minimize frequency jitter of the processor (e.g., 102-N) under the present workload. For example, the monitor module 122 may update the processor frequency transition event counter as the tuner module 124 iteratively adjusts an upper frequency limit of the processor frequency dynamic range to minimize the processor frequency transition event counter. In some implementations, the tuner module 124 also may adjust the processor frequency dynamic range to reduce frequency jitter based on a mathematical model that accounts for thermal or power headroom and frequency dynamic range.

In another example, the self-tune controller 120 may adjust a prefetching function of the computing system 100. Prefetching data may be useful when the prefetched data is realized. When the data is not realized, the increased bus utilization associated with prefetching may decrease computing system performance, as well as cost additional computing system resources in caching and evicting the prefetched data. In some implementations, the monitor module 122 may collect or poll, as low-level operation information, a bus utilization and a bus transaction count per requestor (e.g., for a memory bus or an I/O bus), and the tuner module 124 may set the prefetching enable state to disabled for a first requestor having a bus transaction count lower than a bus transaction count of a second requestor, when the bus utilization is above a predetermined threshold. In other words, if the bus utilization is high and the utilization can be attributed (directly or inferentially) to the second requestor rather than the first requestor, the prefetcher for the first requestor may be minimalized or disabled.

In another example, the self-tune controller 120 may adjust settings to affect the power efficiency of the computing system 100, and more particularly, the power efficiency of a bus or busses of the computing system 100. In some implementations, adjusting settings to affect the power efficiency may be performed after one or more of the other adjustments described above have been performed. In some implementations, the monitor module 122 may collect or poll, as low-level operation information, processor utilization and bus utilization for a particular bus or busses, while the computing system 100 is executing a present workload. In some implementations, the tuner module 124 may analyze the processor utilization and bus utilization to determine if a processor (e.g., 102-1 through 102-N), a bus (e.g., 108-1 through 108-N, 110-1 through 110-N, 112-1, or 112-2), or other component (e.g., memory 104-1 through 104-N, device 106-1, 106-2) is underutilized. For example, processor or bus utilization below a predetermined threshold may be deemed by the tuner module 124 to be underutilization. The tuner module 124 may adjust a power, a speed, or a width of the bus or busses to minimize underutilization of the bus, power consumption of the bus, or thermal load of the bus. The tuner module 124 also may adjust other power-saving configurations of a processor, a bus, or other component of the computing system 100 in a similar manner.

In some implementations, the computing system 100 may include a base management controller 140 (also referred to as a lights-out management controller). A user may remotely manage aspects of the computing system 100 via an out-of-band network connection to the base management controller 140, even in the event of a failure of the computing system 100. In some implementations, the monitor module 122 may report collected low-level operation information to the base management controller 140, or the tuner module 124 may report setting adjustments to the base management controller 140. By virtue of reporting the operation information or the setting adjustments, a user may analyze what resources were stressed at the time of a failure of the computing system 100. Moreover, by virtue of the base management controller 140, a user also may have access to rich low-level operation information to perform additional, manual fine tuning of computing system settings.

Figure 2:
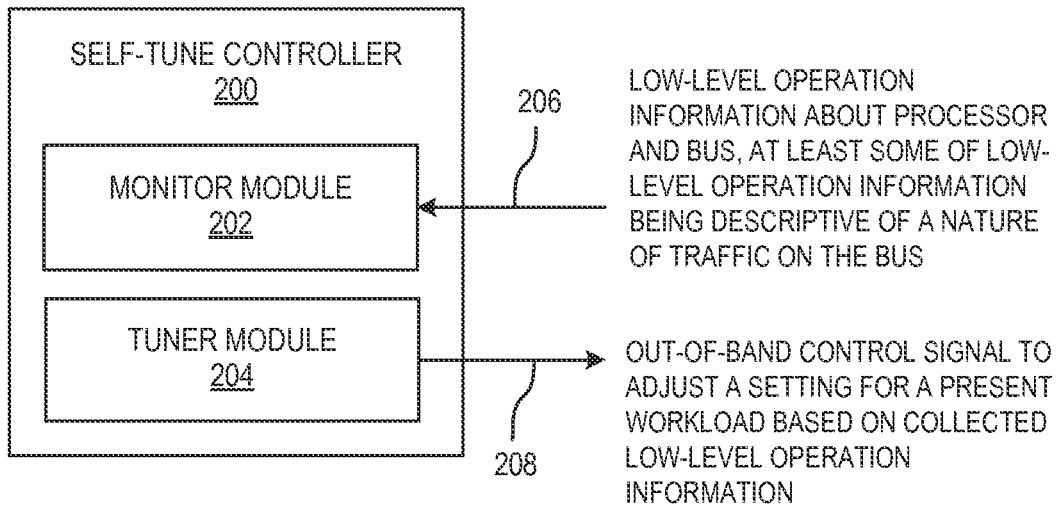
FIG. 2 is a block diagram of an example self-tune controller to adjust a setting of a computing system for a workload according to an implementation.

FIG. 2 is a block diagram of a self-tune controller 200 according to an example implementation. The self-tune controller 200 includes a monitor module 202 and a tuner module 204. In some implementations, the monitor module 202 may collect, via an out-of-band data stream 206, low-level operation information about a processor of a computing system and a bus of the computing system under a present workload. In some implementations, at least some of the low-level operation information collected by the monitor module 202 may be descriptive of a nature of traffic on the bus. In some implementations, the tuner module 204 may dynamically adjust, via an out-of-band control signal 208, a setting of the computing system for the present workload and based on low-level operation information collected by the monitor module 202.

Figure 3:
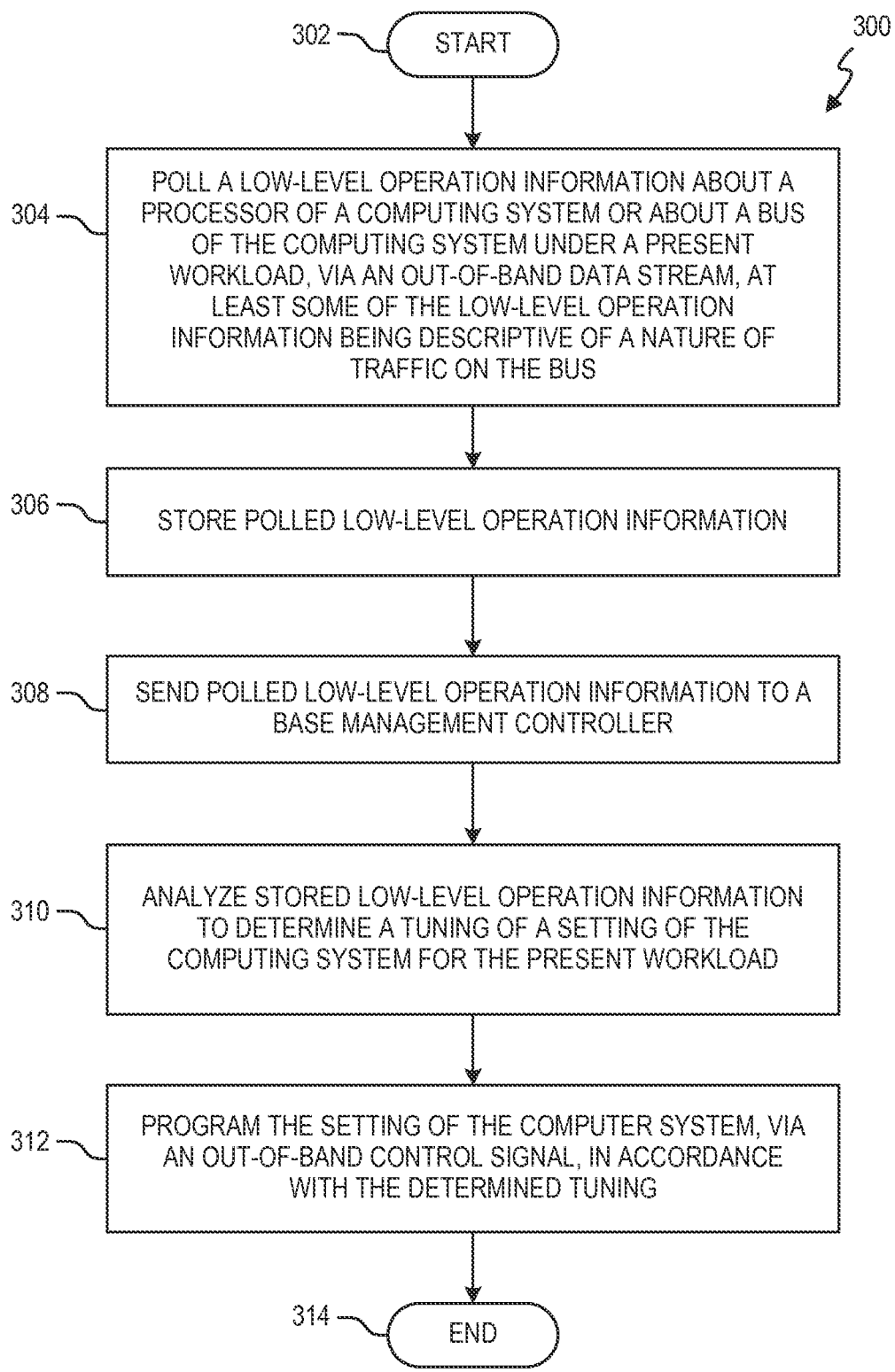
FIG. 3 is a flowchart of an example method for determining a tuning of a setting of a computing system according to an implementation.

FIG. 3 is a flowchart of an example method 300 for determining a tuning of a setting of a computing system according to an implementation. Method 300 may be described below as being executed or performed by a self-tune controller, such as the self-tune controller 120 of FIG. 1. In some implementations, the self-tune controller may be embedded in a computing system, such as computing system 100. Various other suitable systems may be used as well, such as, for example, the self-tune controller 200 of FIG. 2. Method 300 may be implemented in the form of executable instructions stored on a machine-readable storage medium and executed by at least one processor of the self-tune controller 120 or 200, and/or in the form of electronic circuitry. In some implementations of the present disclosure, one or more blocks of method 300 may be executed substantially concurrently or in a different order than shown in FIG. 3. In some implementations of the present disclosure, method 300 may include more or less blocks than are shown in FIG. 3. In some implementations, one or more of the blocks of method 300 may, at certain times, be ongoing and/or may repeat.

The method 300 may begin at block 302, and continue to block 304, where the self-tune controller 120 may poll, by a monitor module 122 for example, a low-level operation information about a processor of a computing system and about a bus of the computing system under a present workload, via an out-of-band data stream. In some implementations, at least some of the low-level operation information may be descriptive of a nature of traffic on the bus. In some implementations, the low-level operation information may include a processor utilization, a bus utilization, a processor limiting event, a bus limiting event, a bus transaction rate, a bus transaction count, or a processor frequency transition event counter.

At block 306, the self-tune controller 120 may store, by the monitor module 122 for example, low-level operation information polled at block 304. For example, the low-level operation information may be stored in memory or storage of the computing system. At block 308, the self-tune controller 120 may send, by the monitor module 122 for example, the low-level operation information polled at block 304 to a base management controller of the computing system.

At block 310, the self-tune controller 120 may analyze, by a tuner module 124 for example, low-level operation information stored at block 308 to determine a tuning of a setting of the computing system for the present workload. In some implementations, the tuner module 124 may determine the tuning based on the low-level operation information in a manner similar to the examples described above for the self-tune controller 120 of FIG. 1. In some implementations, the computing system setting for which the tuner module 124 determines a tuning may include a requestor queue depth allotment, an aggressiveness of a thermal management profile of an electronic component of the computing system, a snoop mode, a memory patrol scrubbing enable state, a maximum bus payload size, a processor frequency dynamic range, a prefetching enable state, a bus power, a bus speed, or a bus width.

At block 312, the self-tune controller 120 may program, by the tuner module 124 for example, the setting of the computing system in accordance with the tuning determined at block 310. In some implementations, the self-tune controller 120 may program the setting via an out-of-band control signal, and more particularly, by modifying firmware parameters that affect the operation of hardware of the computing system. After block 312, the method 300 may end at block 314.

Figure 4:
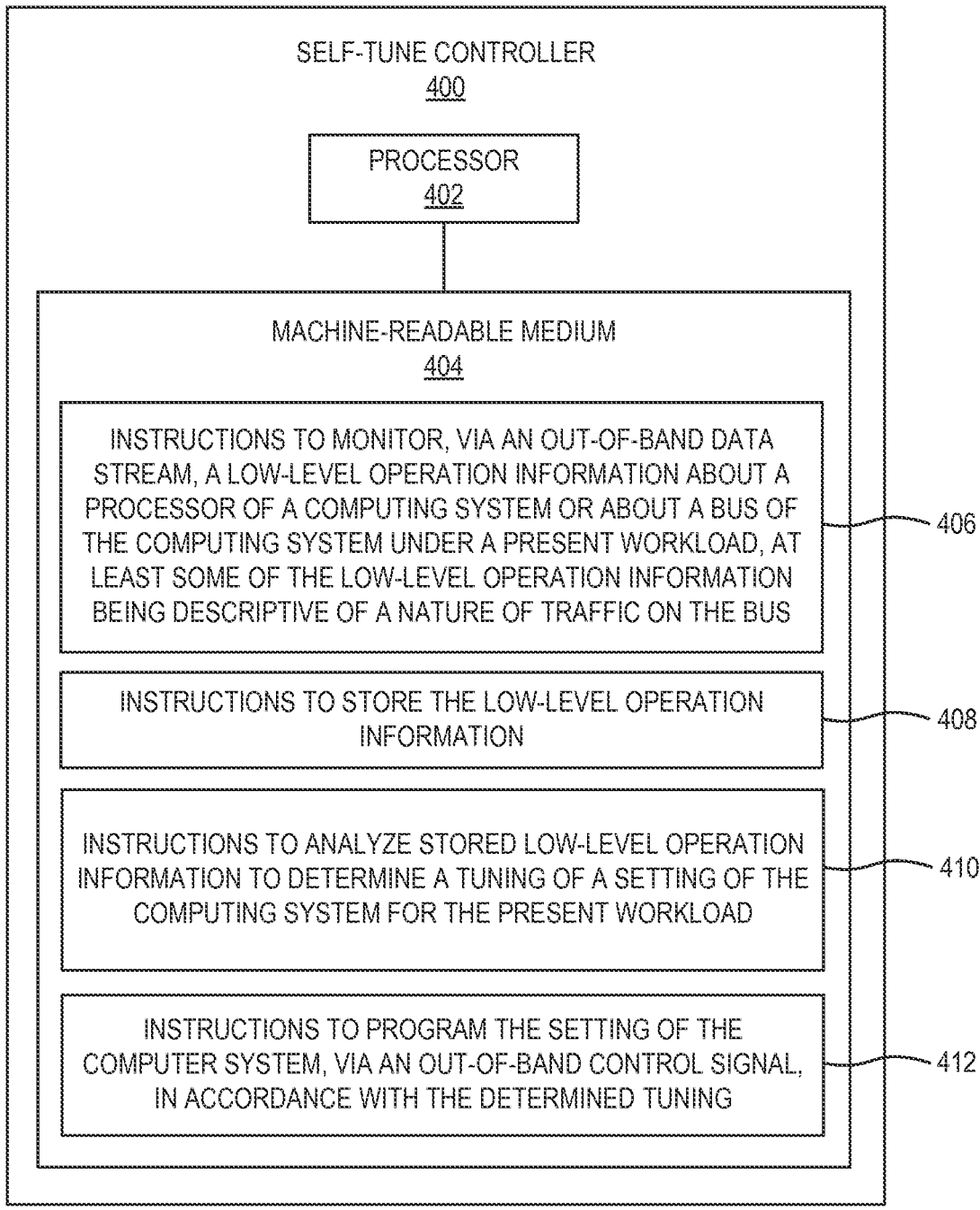
FIG. 4 is a block diagram of an example self-tune controller that includes a non-transitory, machine-readable medium encoded with instructions to determine a tuning of a setting of a computing system for a workload.

FIG. 4 is a block diagram illustrating a self-tune controller 400 that includes a machine-readable medium encoded with example instructions to determine a tuning of a setting of a computing system for a present workload. In some implementations, the self-tune controller 400 may serve as or form part of the self-tune controller 120 of FIG. 1 or the self-tune controller 200 of FIG. 2. In some example implementations, the computing system may be analogous to the computing system 100 of FIG. 1. In some implementations, the self-tune controller 400 may include at least one processor 402 coupled to a machine-readable medium 404. The processor 402 may include a single-core processor, a multi-core processor, an application-specific integrated circuit, a field programmable gate array, and/or other hardware device suitable for retrieval and/or execution of instructions from the machine-readable medium 404 (e.g., instructions 406, 408, 410, 412) to perform functions related to various examples. Additionally or alternatively, the processor 402 may include electronic circuitry for performing the functionality described herein, including, but not limited to, the functionality of instructions 406, 408, 410, and/or 412. With respect to the executable instructions represented as boxes in FIG. 4, it should be understood that part or all of the executable instructions and/or electronic circuits included within one box may, in alternate implementations, be included in a different box shown in the figures or in a different box not shown.

The machine-readable medium 404 may be any medium suitable for storing executable instructions, such as random access memory (RAM), electrically erasable programmable read-only memory (EEPROM), flash memory, hard disk drives, optical discs, or the like. In some example implementations, the machine-readable medium 404 may be a tangible, non-transitory medium, where the term "non-transitory" does not encompass transitory propagating signals. The machine-readable medium 404 may be disposed within the self-tune controller 400, as shown in FIG. 4, in which case the executable instructions may be deemed "installed" or "embedded" on the self-tune controller 400, Alternatively, the machine-readable medium 404 may be a portable (e.g., external) storage medium, for example, that allows the self-tune controller 400 to remotely execute the instructions or download the instructions from the storage medium. In this case, the executable instructions may be part of an "installation package." As described further herein below, the machine-readable medium 404 may be encoded with a set of executable instructions 406, 408, 410, 412.

Instructions 406, when executed by the processor 402, may poll (or collect or monitor), via an out-of-band data stream, a low-level operation information about a processor of a computing system and about a bus of the computing system under a present workload. The processor of the computing system may be separate and different from the processor 402 of the self-tune controller 400. In some implementations, at least some of the monitored low-level operation information may be descriptive of a nature of traffic on the bus. In some implementations, the low-level operation information may include a processor utilization, a bus utilization, a processor limiting event, a bus limiting event, a bus transaction rate, a bus transaction count, or a processor frequency transition event counter. Instructions 408, when executed by the processor 402, may store the low-level operation information monitored by instructions 406. For example, the low-level operation information may be stored in memory (e.g., the machine-readable medium 404) or storage of the computing system.

Instructions 410, when executed by the processor 402, may analyze the stored low-level operation information to determine a tuning of a setting of the computing system for the present workload. For example, instructions 410 may determine the tuning based on the low-level operation information in a manner similar to the examples described above for the self-tune controller 120 of FIG. 1. In some implementations, instructions 410 may determine a tuning for a setting such as a requester queue depth allotment, an aggressiveness of a thermal management profile of an electronic component of the computing system, a snoop mode, a memory patrol scrubbing enable state, a maximum bus payload size, a processor frequency dynamic range, a prefetching enable state, a bus power, a bus speed, or a bus width. Instructions 412, when executed by the processor 402, may program the setting of the computing system, via an out-of-band control signal, in accordance with the tuning determined by instructions 410.

Figure 5:
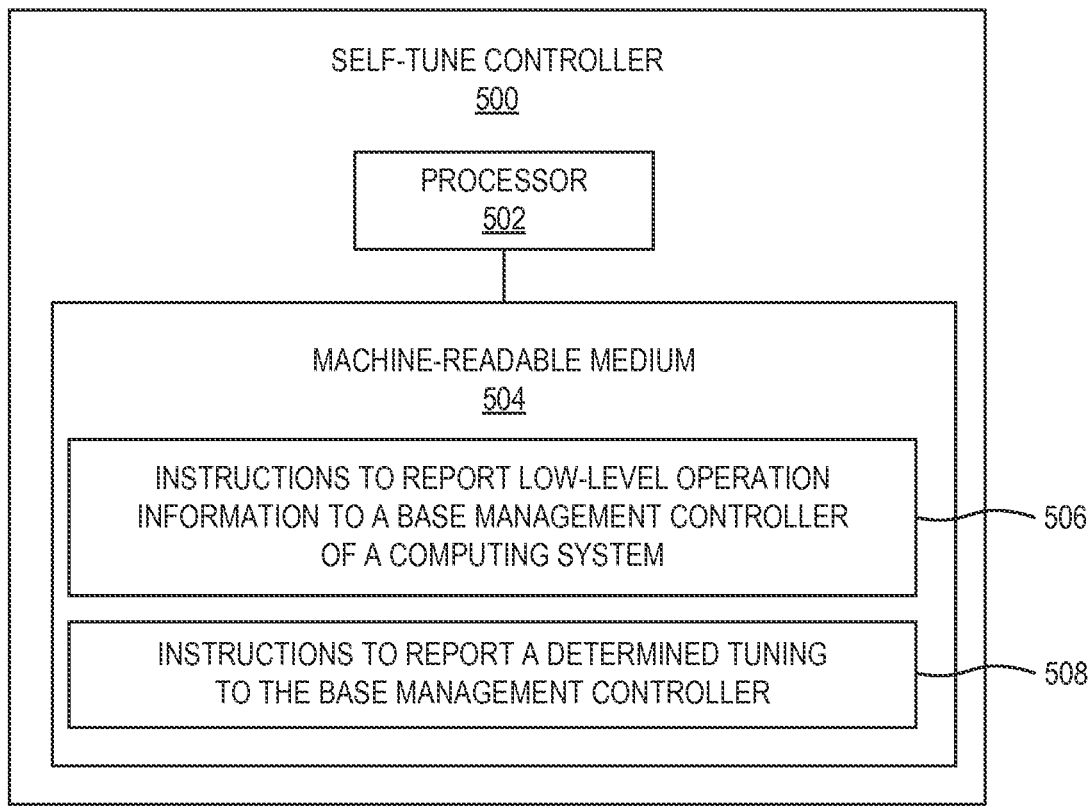
FIG. 5 is a block diagram of an example self-tune controller that includes a non-transitory, machine-readable medium encoded with instructions to report to a base management controller.

FIG. 5 is a block diagram illustrating a self-tune controller 500 that includes a machine-readable medium encoded with example instructions to report to a base management controller. The self-tune controller 500 includes a processor 502 and a machine-readable medium 504, which may be analogous in many respects to the processor 402 and the machine-readable medium 404, respectively. The machine-readable medium 504 may be encoded with a set of executable instructions 506, 508. Additionally or alternatively, the processor 502 may include electronic circuitry for performing the functionality described herein, including, but not limited to, the functionality of instructions 506, 508.

Instructions 506 may, when executed by the processor 502, report low-level operation information (e.g., low-level operation information monitored by instructions 406) to a base management controller of the computing system. Instructions 508 may, when executed by the processor 502, report a determined tuning (e.g., the tuning determined by instructions 410) to the base management controller.

In view of the foregoing description, it can be appreciated that a computing system may be dynamically adjusted for a present workload by a self-tune controller that monitors low-level operation information of the computing system, such as bus and processor utilization. In some instances, such adjustments may improve or optimize the functioning of the computing system for the present workload. Moreover, by virtue of the foregoing description, it can be appreciated that the self-tune controller may adjust the computing system automatically without input from a user and with reduced or minimized downtime and interruption of the computing system.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

We claim:

1. A self-tune controller comprising:
a monitor module to collect, via an out-of-band data stream, low-level operation information about a processor of a computing system and a bus of the computing system under a present workload, wherein at least some of the low-level operation information being descriptive of a nature of traffic on the bus, the monitor module collects at least some of the low-level operation information without utilizing execution cycles of the processor, the low-level operation information collected by the monitor module includes a processor frequency transition event counter, and the processor having a dynamic overclocking function; and a tuner module to dynamically adjust, via an out-of-band control signal, a setting of the computing system for the present workload and based on collected low-level operation information, wherein the tuner module dynamically adjusts the setting without utilizing execution cycles of the processor, the setting includes a processor frequency dynamic range, and the tuner module is to adjust the processor frequency dynamic range to minimize processor frequency jitter of the processor under the present workload.

2. The self-tune controller of claim 1,
the monitor module and the tuner module operate independent of an operating system of the computing system,
the monitor module is to report collected low-level operation information to a base management controller of the computing system, and
the tuner module is to report setting adjustments to the base management controller.

3. The self-tune controller of claim 1, wherein the low-level operation information collected by the monitor module relates directly or inferentially to a bus transaction rate per requestor on the bus,
the setting includes a requestor queue depth allotment per requestor, and
the tuner module is to adjust a requestor queue depth allotment relative to a corresponding bus transaction rate per requestor.

4. The self-tune controller of claim 1, wherein the low-level operation information collected by the monitor module includes a processor utilization, a bus utilization, a processor limiting event, or a bus limiting event,
the setting includes an aggressiveness of a thermal management profile of the computing system, and
the tuner module is to adjust the aggressiveness of the thermal management profile to reduce self-limiting of an electronic component of the computing system.

5. The self-tune controller of claim 1, wherein the low-level operation information collected by the monitor module includes a bus utilization between the processor and non-local memory and a bus utilization between the processor and local memory, wherein the processor communicates with the non-local memory in part via a processor interconnect bus,
the setting includes a snoop mode, and
the tuner module is to:
select a first snoop mode when the bus utilization between the processor and non-local memory is greater than the bus utilization between the processor and local memory, and
select a second snoop mode when the bus utilization between the processor and local memory is greater than the bus utilization between the processor and non-local memory.

6. The self-tune controller of claim 5, wherein the first snoop mode includes an Early Snoop mode or a Home Snoop mode, and the second snoop mode includes a Cluster on Die mode.

7. The self-tune controller of claim 1, wherein the low-level operation information collected by the monitor module includes a memory bus utilization,
the setting adjusted by the tuner module relates to a memory patrol scrubbing feature, and
the tuner module is to adjust a parameter of the memory patrol scrubbing to minimize impact on computing system power consumption or computing system performance under the present workload.

8. The self-tune controller of claim 1, wherein the low-level operation information collected by the monitor module includes a bus utilization and a bus transaction rate for a particular bus,
the setting includes a maximum payload size for the particular bus, and
the tuner module is to determine an average payload size for the particular bus based on the bus utilization and the bus transaction rate and to adjust the maximum payload size based on the determined average payload size.

9. The self-tune controller of claim 1, wherein the low-level operation information collected by the monitor module includes a bus utilization and a bus transaction count per requestor,
the setting includes a prefetching enable state, and
the tuner module is to set the prefetching enable state to disabled for a first requestor having a bus transaction count lower than a bus transaction count of a second requestor when the bus utilization is above a predetermined threshold.

10. The self-tune controller of claim 1, wherein the low-level operation information collected by the monitor module includes a processor utilization and a bus utilization for a particular bus,
the setting includes a power, a speed, or a width of the particular bus, and
the tuner module is to adjust the power, the speed, or the width of the particular bus to minimize underutilization of the particular bus, power consumption of the particular bus, or thermal load of the particular bus.

11. The self-tune controller of claim 1, wherein the monitor module and the tuner module are included in a southbridge of the computing system separate from the processor.

12. The self-tune controller of claim 1, wherein the processor is among a plurality of processors of the computing system,
the bus is a processor interconnect bus connecting some of the plurality of processors, and
the monitor module collects low-level operation information about traffic on the processor interconnect bus.

13. The self-tune controller of claim 1, wherein the monitor module is to collect low-level operation information about traffic on a processor interconnect bus, a memory bus, an I/O bus, and a bus connecting the processor to a southbridge.

14. A method comprising:
polling, by a self-tune controller, low-level operation information about a processor of a computing system and about a bus of the computing system under a present workload, via an out-of-band data stream and without utilizing execution cycles of the processor, wherein at least some of the low-level operation information being descriptive of a nature of traffic on the bus, the low-level operation information includes a processor frequency transition event counter, and the processor has a dynamic overclocking function;
storing, by the self-tune controller, the polled low-level operation information;

sending, by the self-tune controller, the polled low-level operation information to a base management controller of the computing system;

analyzing, by the self-tune controller and without utilizing execution cycles of the processor, the stored low-level operation information to determine a tuning of a setting of the computing system for the present workload, wherein the setting includes a processor frequency dynamic range and the analyzing determines an adjustment to the processor frequency dynamic range that minimizes processor frequency litter of the processor under the present workload; and programming the setting of the computing system, by the self-tune controller via an out-of-band control signal and without utilizing execution cycles of the processor, in accordance with the determined tuning.

15. The method of claim 14, wherein the low-level operation information includes a processor utilization, a bus utilization, a processor limiting event, a bus limiting event, a bus transaction rate, a bus transaction count, or a processor frequency transition event counter, and the setting includes a requestor queue depth allotment, an aggressiveness of a thermal management profile of an electronic component of the computing system, a snoop mode, a memory patrol scrubbing enable state, a maximum bus payload size, a processor frequency dynamic range, a prefetching enable state, a bus power, a bus speed, or a bus width.

16. A non-transitory machine readable medium, storing instructions executable by a self-tune controller, the non-transitory machine readable medium comprising:

instructions to poll, via an out-of-band data stream and without utilizing execution cycles of a processor of the computing system, low-level operation information about the processor and about a bus of the computing system under a present workload, wherein at least some of the low-level operation information being descriptive of a nature of traffic on the bus, the low-level operation information includes a processor frequency transition event counter, and the processor has a dynamic overclocking function;

instructions to store the low-level operation information;

instructions to analyze stored low-level operation information to determine a tuning of a setting of the computing system for the present workload, without utilizing execution cycles of the processor to analyze the stored low-level operation information, wherein the setting includes a processor frequency dynamic range and the tuning includes an adjustment to the processor frequency dynamic range that minimizes processor frequency jitter of the processor under the present workload; and instructions to program the setting of the computing system, via an out-of-band control signal and without utilizing execution cycles of the processor, in accordance with the determined tuning.

17. The non-transitory machine readable medium of claim 16, further comprising:

instructions to report the low-level operation information to a base management controller of the computing system; and instructions to report the determined tuning to the base management controller.

18. The non-transitory machine readable medium of claim 16, wherein the low-level operation information includes a processor utilization, a bus utilization, a processor limiting event, a bus limiting event, a bus transaction rate, a bus transaction count, or a processor frequency transition event counter, and the setting includes a requestor queue depth allotment, an aggressiveness of a thermal management profile of an electronic component of the computing system, a snoop mode, a memory patrol scrubbing enable state, a maximum bus payload size, a processor frequency dynamic range, a prefetching enable state, a bus power, a bus speed, or a bus width.

19. The non-transitory machine readable medium of claim 16, wherein the instructions to poll low-level operation information about the processor and about a bus include instructions to poll a processor interconnect bus that connects the processor to another processor of the computing system.

* * * * *